(12) United States Patent
Liberkowski

(10) Patent No.: US 7,252,854 B2
(45) Date of Patent: Aug. 7, 2007

(54) METHOD AND APPARATUS FOR APPLYING A GEL

(75) Inventor: Janusz Liberkowski, San Jose, CA (US)

(73) Assignee: Intel Corporation, Santa Clara, CA (US)

( * ) Notice: Subject to any disclaimer, the term of this patent is extended or adjusted under 35 U.S.C. 154(b) by 329 days.

(21) Appl. No.: 11/073,301

(22) Filed: Mar. 4, 2005

(65) Prior Publication Data
US 2005/0194703 A1    Sep. 8, 2005

Related U.S. Application Data

(62) Division of application No. 10/236,470, filed on Sep. 5, 2002, now Pat. No. 6,890,588.

(51) Int. Cl.
*B05D 5/06* (2006.01)
(52) U.S. Cl. .................. 427/162; 427/164; 427/207.1; 427/242; 427/294; 385/80; 385/137; 118/50; 118/300; 118/319; 118/320; 118/321; 118/600
(58) Field of Classification Search ................ 427/162, 427/164, 207.1, 242, 294; 118/50, 300, 319, 118/320, 321, 600; 385/137, 80
See application file for complete search history.

(56) References Cited

U.S. PATENT DOCUMENTS

| 3,622,419 A | 11/1971 | London et al. |
| 4,326,480 A | 4/1982 | Glatt |
| 4,830,450 A | 5/1989 | Connell et al. |
| 5,074,683 A | 12/1991 | Tarn et al. |
| 5,135,590 A | 8/1992 | Basavanhally et al. |
| 5,185,846 A | 2/1993 | Basavanhally et al. |
| 5,281,301 A | 1/1994 | Basavanhally |
| 5,394,498 A | 2/1995 | Hinterlong et al. |
| 5,509,954 A | 4/1996 | Derian et al. |
| 5,547,508 A | 8/1996 | Affinito |
| 5,658,364 A | 8/1997 | DeVore et al. |
| 5,907,650 A | 5/1999 | Sherman et al. |
| 6,027,253 A | 2/2000 | Ota et al. |
| 6,216,939 B1 | 4/2001 | Thackara |

(Continued)

OTHER PUBLICATIONS

U.S. Appl. No. 11/073,201, filed Mar. 4, 2005, Liberkowski, "Method and Apparatus for Applying a Gel," Office Action mailed on May 2, 2006.

*Primary Examiner*—Alain L. Bashore
(74) *Attorney, Agent, or Firm*—Blakely, Sokoloff, Taylor & Zafman LLP

(57) ABSTRACT

A rotatable vacuum chamber receives an optical connector having an output face on which an optical gel is applied substantially without entrapped air. Opposite the output face is placed a gel dispenser with its opened nozzle pointing towards the output face. Uncured gel components contained in the dispenser are outgased prior to application of the gel on the output face while a vacuum is maintained in the chamber. Outgasing takes place at a first chamber orientation with the nozzle pointing upwards through which the outgasing air ventilates. The gel is applied at a second chamber orientation where the output face is horizontal and upwards pointing. Immediately following the gel application, the vacuum is unmade to prevent cooking of the mixed and uncured gel. A glass plate is then pressed against the applied fluid gel.

8 Claims, 4 Drawing Sheets

U.S. PATENT DOCUMENTS

| | | |
|---|---|---|
| 6,428,852 B1 | 8/2002 | Pillion et al. |
| 6,470,123 B1 | 10/2002 | Sherman et al. |
| 6,487,878 B1 | 12/2002 | Meguro et al. |
| 6,488,074 B2 | 12/2002 | Usui |
| 6,618,541 B2 | 9/2003 | Kaiser et al. |
| 6,632,415 B2 | 10/2003 | Miller et al. |
| 6,712,525 B1 | 3/2004 | Kawase et al. |
| 6,823,127 B2 | 11/2004 | Nasiri et al. |
| 2001/0051028 A1 | 12/2001 | Gutierrez et al. |
| 2002/0154882 A1 | 10/2002 | Moran |
| 2003/0002804 A1 | 1/2003 | Trezza et al. |
| 2003/0007758 A1 | 1/2003 | Rose et al. |
| 2003/0075102 A1 | 4/2003 | Crocker |
| 2003/0180453 A1 | 9/2003 | Burke et al. |
| 2004/0060685 A1 | 4/2004 | Ray et al. |

METHOD AND APPARATUS FOR APPLYING A GEL

CROSS-REFERENCE TO RELATED APPLICATIONS

This application is a divisional of, and claims priority under 35 U.S.C. § 120 from. U.S. patent application Ser. No. 10/236,470, filed Sep. 5, 2002, now U.S. Pat. No. 6,890,588. This application cross-references the concurrently filed U.S. patent application Ser. No. 10/236,471, now U.S. Pat. No. 6,823,127 for "Apparatus for Holding a Fiber Array" of Steven Nasiri, Janusz Liberkowski, Eddy Chen and Jeff Jarfa, which is hereby incorporated by reference.

FIELD OF THE INVENTION

The present invention relates to method and apparatus for applying a gel in vacuum. Particularly, the present invention relates to method and apparatus for applying an optical gel on an output face of an optical connector.

BACKGROUND

In the field of optical data communication, increasingly complex devices are developed with ever growing numbers of integrated and simultaneously operated optical fibers. Such devices, like for example, optical switching fabric integrate more than thousand optical fibers and perform simultaneous switching operations between the individual fibers. In order to efficiently handle such a large number of integrated fibers, special constructive efforts are necessary. Sub components like, for example, optical connectors are designed to tightly combine and hold fibers such that their ends are planar arrayed and parallel oriented on an output face. Information carrying light beams propagate towards and away from the fiber ends embedded and coplanar polished together with the output face. The efficiency of the beam propagation in and out of the fiber ends is highly dependent on the surface quality of the output face. Several fabrication steps are performed to insert and bond the fiber ends and then grind and polish the output face.

During the lifetime of an optical switching fabric, the output face needs to be protected against humidity to prevent corrosive damage. An optical connector may be designed to hermetically seal the output face. For that purpose, a glass plate may be placed on top of the output face. In such a case, the gap between the output face and the glass plate is filled with an optical gel that has substantially the same refractive index as the glass plate. In that context it is referred to the concurrently filed Patent Application for "Apparatus for Holding a Fiber Array" of Janusz Liberkowski and Steven Nasiri. While applying the gel and sealing the gap between the glass plate and the output face it is crucial that entrapped air bubbles are avoided.

Conventional methods where the gel is applied under atmospheric air pressure have proven insufficient. There are three main reasons for that. Firstly, microscopic air bubbles tend to adhere to the output face while the gel is applied. The air bubbles appear to adhere at the boundaries between the four materials present at the output face, which may be silicon of the insert in which the fiber ends are inserted, glass of the fiber, glass plate end and epoxy with which the fiber end is bonded. When the gel is pressed between surface of the silicon and surface of the glass, air bubbles are squeezed out from the gel layer.

Secondly, the unmixed gel components themselves may contain entrapped air. And thirdly, immediately prior gel application, the individual gel components are mixed to initiate the chemical reaction that causes the curing of the gel. During the mixing, air may also be entrapped.

These three reasons to the contrary, the mixed gel needs to be kept under atmospheric pressure to avoid a well-known cooking of the gel in the vacuum where gas bubbles are formed within the gel.

Therefore, there exists a need for a special method and apparatus for applying a gel to a face and to seal a gap between two faces without entrapped air bubbles and to avoid cooking of the gel. The present invention addresses this need.

SUMMARY

In the present invention, eventual entrapped air is outgased from the unmixed gel components before the gel components are mixed and applied onto the output face. In addition, the mixing of the gel and its application on the output face is performed under substantially reduced air pressure. As a consequence, entrapped air bubbles are avoided. Immediately following the mixing and application of the gel atmospheric pressure is reapplied to the gel to prevent eventual cooking of it.

The gel is applied in a fashion such that it forms a slightly raised dome shape with the top of it being at a central area of the output face. In a following step, where the glass plate is brought into contact with the uncured gel on the output face, it touches first the gel at the central area of the output face. The glass plate is then continuously forced against the output face and the contact area between the gel and the glass plate enlarges in radial direction. At the same time, excess gel is forced out of the gap flushing the contact area between glass plate and gel. In that way, also the contact area between the glass plate and the gel is kept free of entrapped air bubbles.

After the initial steps of outgasing the unmixed gel, the gel is mixed and applied in vacuum. For that purpose, the optical connector is placed and fixed together with a commercially available gel dispenser in a specifically configured rotatable vacuum chamber. The gel dispenser has preferably two compartments where two unmixed gel components are contained. The compartments terminate in a nozzle where the gel components are mixed and dispensed.

The gel dispenser is placed relative to the optical connector such that the nozzle is pointing at a central location of the output face.

After the work piece and the gel dispenser are fixed, the vacuum chamber is closed and a vacuum is applied for a time period sufficient for the outgasing. During that period, the vacuum chamber is rotated into a first orientation where the nozzle points upwards and the output face consequently points downwards.

Once the outgasing of the gel components is completed, the gel is applied on the output face. A piston like actuator reaches from outside through the housing of the vacuum chamber such that the gel dispenser can be actuated while maintaining the vacuum. During gel application, the vacuum chamber is rotated into a second orientation where the output face points upwards and the nozzle downwards.

Immediately following the gel application, the vacuum is unmade and the glass plate is pressed onto the gel as described in the above. During curing of the gel the glass plate is fixedly held relative to the output face.

The method is relatively simple and allows an efficient fabrication of the desired sealed output face. Adapting the vacuum chamber for an integration of a commercially available gel dispenser allows short setup periods.

DETAILED DESCRIPTION

Figure 1:
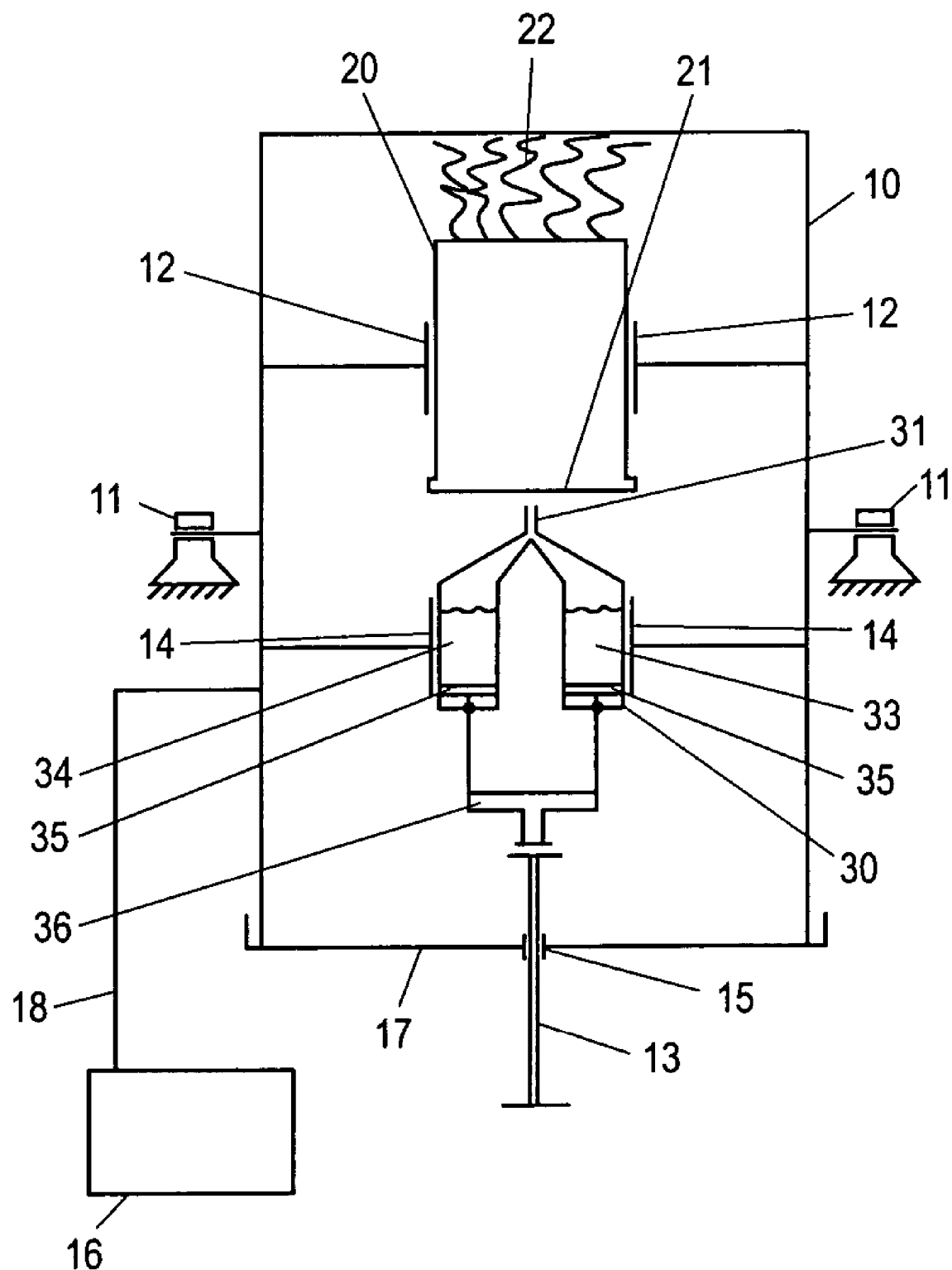
FIG. 1 illustrates schematically the rotating vacuum chamber together with the work piece and the gel dispenser in a first orientation during outgasing of the unmixed gel components.

Referring to FIG. 1, the main components and apparatus for practicing the method of the present invention are described. A main apparatus is a specially configured, rotatable vacuum chamber 10 that pivots around the hinges 11. The vacuum chamber 10 features a work piece holder 12 for fixedly holding a work piece 20 having a gel application face 21. In the preferred embodiment, the work piece 20 is an optical connector and the gel application face 21 is an output face having a number of coplanar fiber ends terminating on it.

The vacuum chamber 10 also features a dispenser holder 14 for fixedly holding a gel dispenser 30. The gel dispenser 30 has a nozzle 31, two compartments for separately containing unmixed gel components 33, 34, and a bridge actuator 36 for combined actuating two separate pistons 35. Each of the pistons 35 slides along one compartment for forcing the gel components 33, 34 towards and through the nozzle 31 when a force is applied to the bridge actuator 36. The gel dispenser 30 may be a commercially available dispenser sold by Nye Optical Product under the name OCK-433. Both holders 12, 14 are configured to easily insert and fixate the work piece 20 and the gel dispenser 30 such that the nozzle 31 is pointing at a central area of the gel application face 21. In the preferred embodiment, where an optical gel OCK is applied, the distance of the nozzle's 31 tip to the gel application face 21 is in the range of 1 mm.

The vacuum chamber 10 further features a dispenser actuator 13 for remotely actuating the gel dispenser 30 from outside the vacuum chamber 10. In its simplest configuration, the dispenser actuator 13 is a mechanically operated rod sliding along a sealed guide 15 in a direction substantially collinear to an actuation direction of the fixed gel dispenser 30. In that way, a force F1 applied at the outside end of the dispenser actuator 13 is transmitted onto the bridge actuator 36 such that the unmixed gel components 33, 34 are forced out of their compartments.

The vacuum chamber 10 may also have a lid 17 for accessing and sealing the vacuum chamber's 10 interior. The lid 17 may have any well-known configuration as may be appreciated by anybody skilled in the art. While the lid 17 is closed, the interior of the vacuum chamber is sealed and may be evacuated by a connected vacuum generator 16. The vacuum generator 16 is placed in proximity of the vacuum chamber 10 and connected via a well-known flexible element for transmitting a vacuum such as a vacuum hose 18. The vacuum hose is configured and connected to the vacuum chamber 10 for an uninhibited rotation of the vacuum chamber 10 of at least 180 degrees around the hinges 11. The vacuum generator 16 may be placed stationary and not participate in the rotation of the vacuum chamber 10. The vacuum generator 16 may be a commercially available product.

In the preferred embodiment, the work piece 20 in its configuration as the optical connector, a number of optical fibers 22 may loosely extend from the work piece 20 at the opposite end of the gel application face 21. In such case, the vacuum chamber 10 may provide sufficient space for receiving the extending optical fibers 22.

In the preferred embodiment, the vacuum chamber 10 may be made of a tube that extends concentrically relative to the assembled work piece 20. The tube may be configured to provide visual access to the fixed gel dispenser 30 and the gel application face 21. In its simplest configuration, the tube may be of transparent material.

Figure 4:
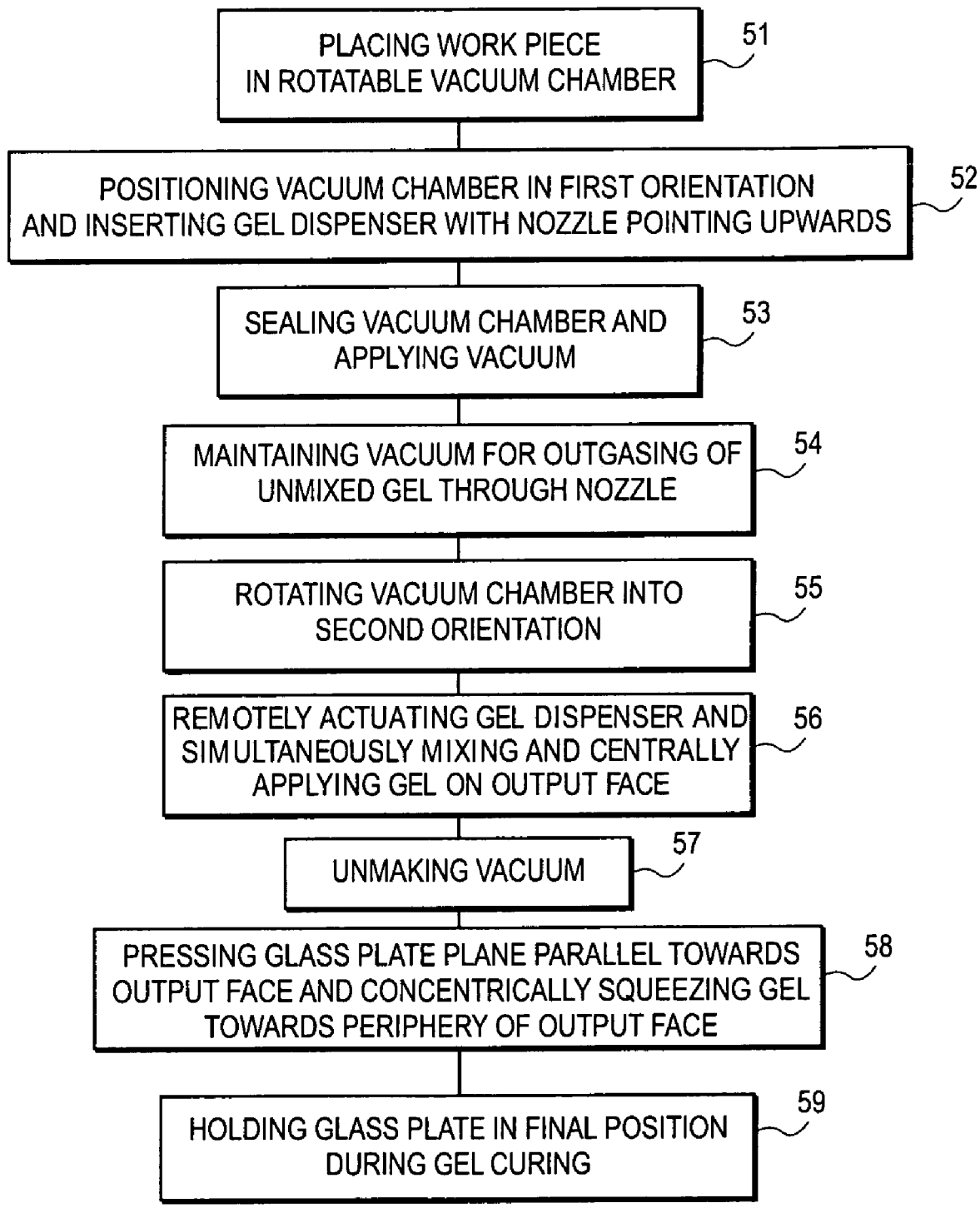
FIG. 4 is a block diagram illustrating the steps included in sealing the output face with a glass plate.

Now, referring to the block diagram of FIG. 4, the method of the present invention will be described in detail. In a first step 51, the work piece 20 is placed and fixed in the holder 12. In the preferred embodiment where also the fibers 22 need to be inserted, the vacuum chamber 10 may be brought into an orientation such that the work piece 20 may be inserted with the fibers 22 hanging downwards.

In a following step 52, the gel dispenser 30 is placed and fixed in the holder 52 after it has been brought into operational configuration, which may include removing a well-known seal of the nozzle 31. In the preferred embodiment, where highly liquid gel components 33, 34 are used, the vacuum chamber 10 may be set in a first orientation such that the gel dispenser is placed and fixated while the opened nozzle 31 is pointing upwards. In that way, gel motion and eventual air entrapment is kept to a minimum.

Next, during step 53 the lid 17 is closed and the vacuum chamber 10 sealed. Then, the vacuum generator 16 is activated and a vacuum in the range of 30 in of mercury or about 100 kPa is applied.

In step 54, the established vacuum is maintained for a period sufficient for outgasing air eventually entrapped and dissolved under atmospheric pressure in the unmixed gel components 33, 34. In the preferred embodiment, where the above-mentioned type gel dispenser 30 is utilized, the vacuum is maintained for a period in the range of 24 hours. During the outgasing, the vacuum chamber 10 is kept in a first orientation where the nozzle is pointing upwards. In that way, air that rises in the gel components 33, 34 may ventilate through the open nozzle 31.

After the outgasing is completed, an optional step may be performed before rotating the vacuum chamber 10 into a second orientation and applying the mixed gel. In the preferred embodiment, where a highly liquid optical gel is applied, the gel dispenser 30 may be remotely actuated via the actuator 13 such that the gel components 33, 34 are forced up to the nozzle's 31 tip. In that way, the entire cavity of the gel dispenser 30 is filled with gel, which may be advantageous when initiating the application of the highly liquid optical gel as is described in the below under step 56.

In step 55, the vacuum chamber 10 is rotated into the second orientation, where the nozzle 31 is pointing downwards and the gel application face 21 is substantially horizontal and pointing upwards.

Figure 2:
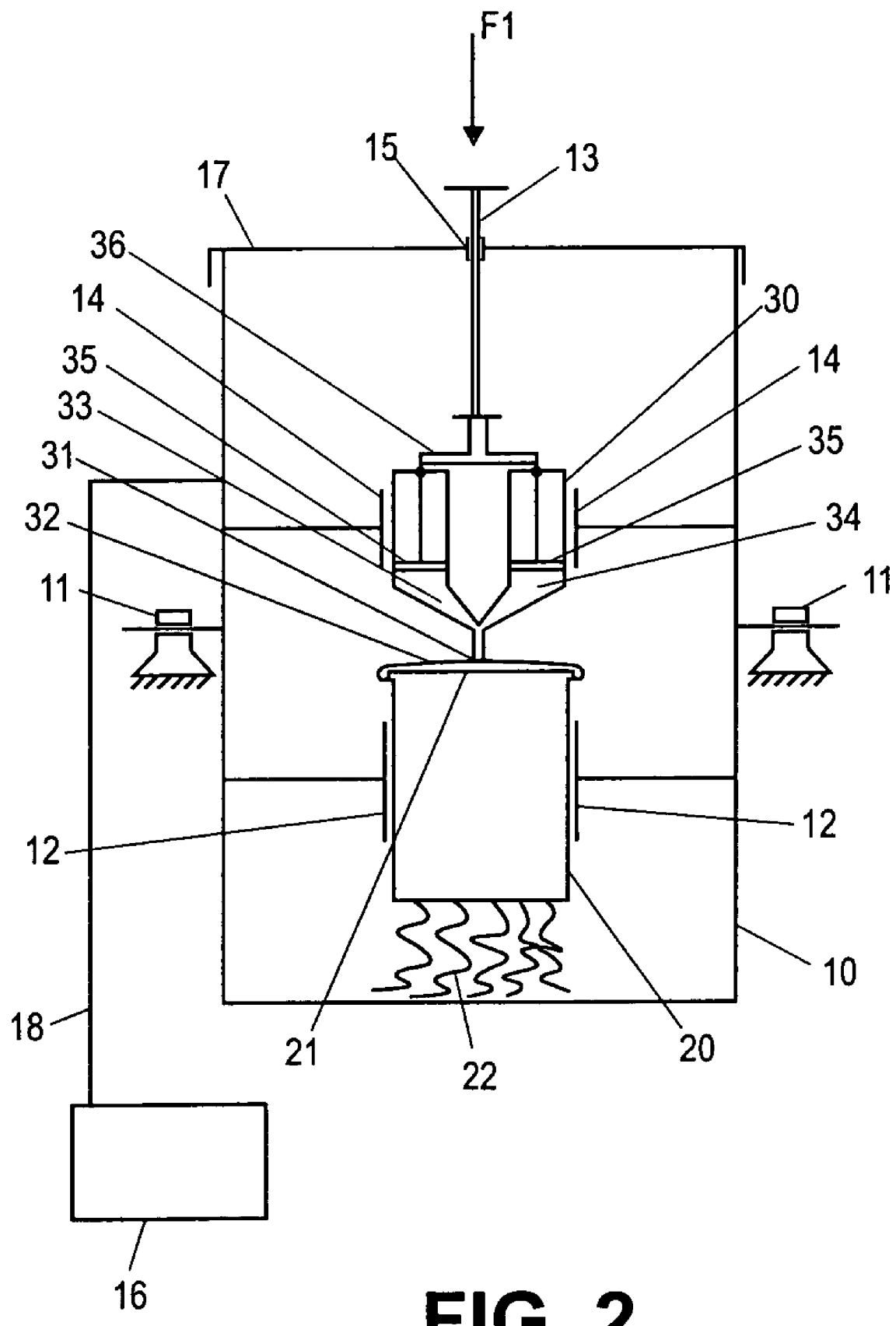
FIG. 2 depicts the apparatus of FIG. 1 in a second orientation during gel application.

Immediately following is step 56 where the gel components 33, 34 are continuously mixed in the nozzle 31 and centrally dispensed onto the gel application face 21. The step 56 is schematically illustrated in FIG. 2. During step 56, the force F1 is applied on the actuator 13 and transmitted onto the bridge actuator 36 and the pistons 35. The gel components 33, 34 are pressurized and forced through the nozzle 31 onto the face 21 where the mixed and uncured gel 32 forms a dome like fluid layer. In the preferred embodiment, the fluid layer has a thickness of about 2 mm.

The application of the fluid layer is swiftly performed to minimize the period during which the mixed gel is exposed to the vacuum such that the risk of eventual well-known cooking of the gel is kept to a minimum. The cooking is a result of a chemical reaction that typically requires a certain time to initiate and is substantially avoided if the vacuum is timely unmade, step 57. In the preferred embodiment, the application period of the above-specified optical gel is in the range of 10 to 15 min at 25° C. Increase of the temperature will significantly shortening set time as it may be appreciated by anybody skilled in the art.

Figure 3A:
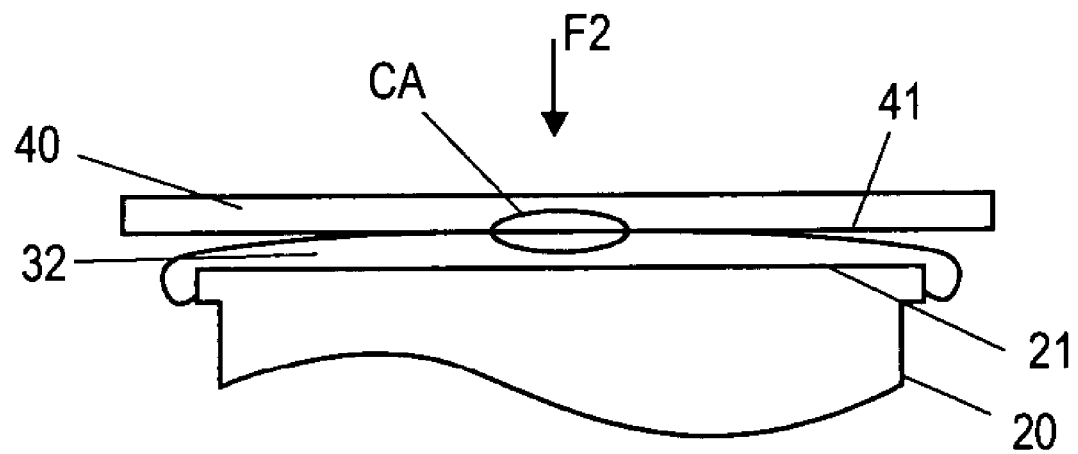
FIGS. 3a, 3b show two stage of making the sealed gap between the glass plate and the output face.
Figure 3B:
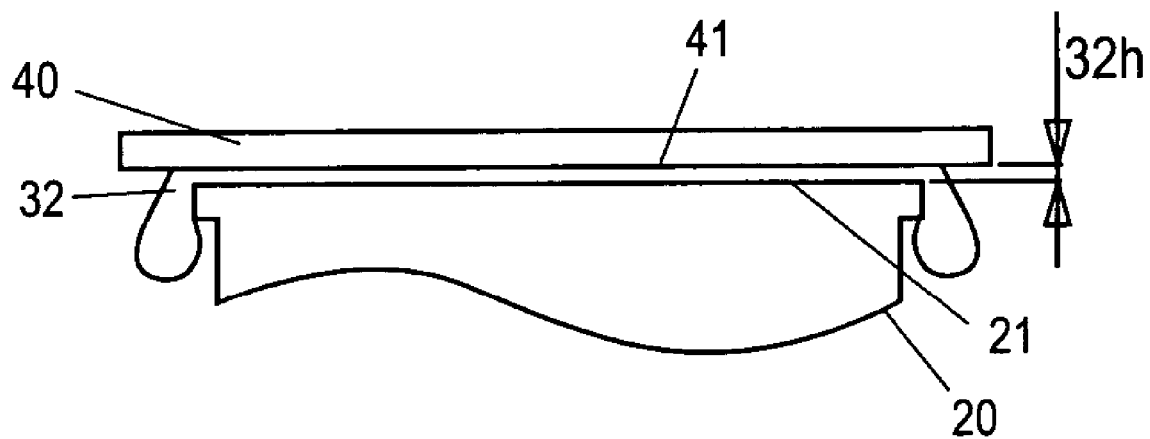

Now, the following step 58 is described by referring to FIGS. 3a, 3b. Once the uncured gel 32 covers the face 21, the gel application is completed and the vacuum chamber 10 opened. After the dispenser 30 is removed and a second work piece 40 is brought with its bottom face 41 into plane parallel orientation to the face 21 and contacted with the uncured gel 32. Due to the dome like shape of the uncured gel 32, the bottom face 41 initially contacts the uncured gel 32 in the central area CA. As the bottom face 41 is pressed towards the face 21 via the force F2, the contact area CA enlarges concentrically. In that way, the gap between the bottom face 41 and the face 21 is filled and sealed by the uncured gel 32 substantially without any entrapped air bubbles. While the bottom face 41 is moving towards the face 21, excess gel is laterally squeezed out of the continuously narrowing gap.

In the preferred embodiment, the second work piece 40 is a glass plate and the uncured gel 32 is an optical gel. Once the optical gel is cured, it has a refractive index substantially matching that of the glass plate. The glass plate may receive the force F2 via an external housing at which the glass plate may be attached. The force F2 may be provided by fastening screws in combination with elastic members configured in conjunction with the viscosity of the optical gel and the size of the face 21 resulting in a predetermined gap thickness 32h. For the above-mentioned type optical gel and an exemplary size of the face 21 of 30×40 mm, a gap thickness 32h in the range of 10 to 400 µm is provided by applying force F2 in the range of 0.49 N to 1.96 N.

In an optional final step 59 and once the desired gap width is reached, the position between first and second work piece 20, 40 is fixed during the curing of the gel.

Accordingly, the scope of the invention described in the specification above is set forth by the following claims and their legal equivalent:

What is claimed is:

1. A method for sealing a gap between a first face and a second face substantially free of entrapped air, said method comprising the following steps of:
    a. placing a first work piece having said first face in a rotatable vacuum chamber such that said first face is pointing downwards;
    b. placing a gel dispenser in said vacuum chamber such that a dispensing nozzle is pointing upwards at a central area of said first face, said gel dispenser containing unmixed gel components;
    c. sealing said vacuum chamber and applying a vacuum;
    d. maintaining said vacuum for an outgasing of said unmixed gel components through said nozzle;
    e. rotating said vacuum chamber together with said first work piece and said gel dispenser such that said first face is pointing upwards and said nozzle is pointing downwards;
    f. remotely actuating said gel dispenser such that said gel components are mixed and applied through said nozzle on said first face;
    g. unmaking vacuum; and
    h. pressing a second work piece with said second face of it substantially plane parallel towards said first face such that an excess portion of said gel applied during step f) is concentrically squeezed out of a gap formed between said first face and said second face.

2. The method of claim 1, further comprising a final step of fixedly holding said second work piece with respect to said first work piece during a curing of said gel.

3. The method of claim 1, whereby said first work piece is an optical connector.

4. The method of claim 3, whereby said face is an output face having an embedded optical fiber end.

5. The method of claim 3, whereby said gel is an optical gel.

6. The method of claim 3, whereby said second work piece is a glass plate.

7. A method for bonding substantially free of entrapped air a glass plate to an optical output face of an optical connector, said method comprising the following steps of:
    a. placing said optical connector in a rotatable vacuum chamber such that said output face is pointing downwards;
    b. placing an optical gel dispenser in said vacuum chamber such that a dispensing nozzle is pointing upwards at a central area of said output face, said gel dispenser containing unmixed gel components;
    c. sealing said vacuum chamber and applying a vacuum;
    d. maintaining said vacuum for an outgasing of said unmixed gel components through said nozzle;
    e. rotating said vacuum chamber together with said optical connector and said gel dispenser such that said output face is pointing upwards and said nozzle is pointing downwards;
    f. remotely actuating said gel dispenser such that said gel components are mixed and applied through said nozzle on said output face;
    g. unmaking vacuum; and
    h. pressing said glass plate substantially plane parallel towards said output face such that an excess portion of said optical gel applied during step f) is concentrically squeezed out of a gap formed between said output face and said glass plate.

8. The method of claim 7, further comprising a final step of fixedly holding said glass plate with respect to said optical connector during a curing of said optical gel.

* * * * *